(12) United States Patent
Hata

(10) Patent No.: US 6,348,937 B2
(45) Date of Patent: *Feb. 19, 2002

(54) COLOR IMAGE FORMING APPARATUS

(75) Inventor: Ryoichi Hata, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/754,496

(22) Filed: Jan. 4, 2001

Related U.S. Application Data

(63) Continuation of application No. 09/515,182, filed on Feb. 29, 2000, now Pat. No. 6,188,418.

(30) Foreign Application Priority Data

Mar. 1, 1999 (JP) ............................................... 11-52194

(51) Int. Cl.$^7$ ..................... B41J 2/385; G01D 15/06; G03G 15/01
(52) U.S. Cl. ..................... 347/116; 399/49; 399/301; 399/302
(58) Field of Search ............................ 399/302, 301, 399/49; 347/116

(56) References Cited

U.S. PATENT DOCUMENTS

| | | |
|---|---|---|
| 5,765,083 A | 6/1998 | Shinohara |
| 5,828,937 A | 10/1998 | Aerens et al. |
| 5,875,380 A * | 2/1999 | Iwata et al. ................. 399/301 |
| 5,896,472 A | 4/1999 | Takayama |
| 6,075,547 A * | 6/2000 | Takeuchi ..................... 347/116 |
| 6,128,459 A * | 10/2000 | Iwata et al. ................. 399/301 |
| 6,134,022 A * | 10/2000 | Yamamoto et al. |
| 6,137,517 A * | 10/2000 | Furst et al. ................. 347/116 |
| 6,144,393 A * | 11/2000 | Kwak ......................... 347/116 |
| 6,166,749 A * | 12/2000 | Lee ............................ 347/116 |
| 6,188,418 B1 * | 2/2001 | Hata .......................... 347/116 |

FOREIGN PATENT DOCUMENTS

| | | |
|---|---|---|
| JP | 7-72702 | * 3/1995 |
| JP | 8-286464 | * 11/1996 |
| JP | 9-12173 | * 1/1997 |

* cited by examiner

Primary Examiner—Susan S. Y. Lee
(74) Attorney, Agent, or Firm—Ratner & Prestia, PC

(57) ABSTRACT

Registration patterns are formed plural times at arbitrary positions in the period determined by the conveying drawing fluctuation period detector when forming registration patterns. The average of the color deviation amount obtained from these plural registration patterns is the color deviation amount. As a result, the color deviation amount can be detected accurately. By detecting the accurate color deviation amount, the precision of color deviation correction is enhanced. It hence presents a color image forming apparatus capable of obtaining images of high print quality.

14 Claims, 13 Drawing Sheets

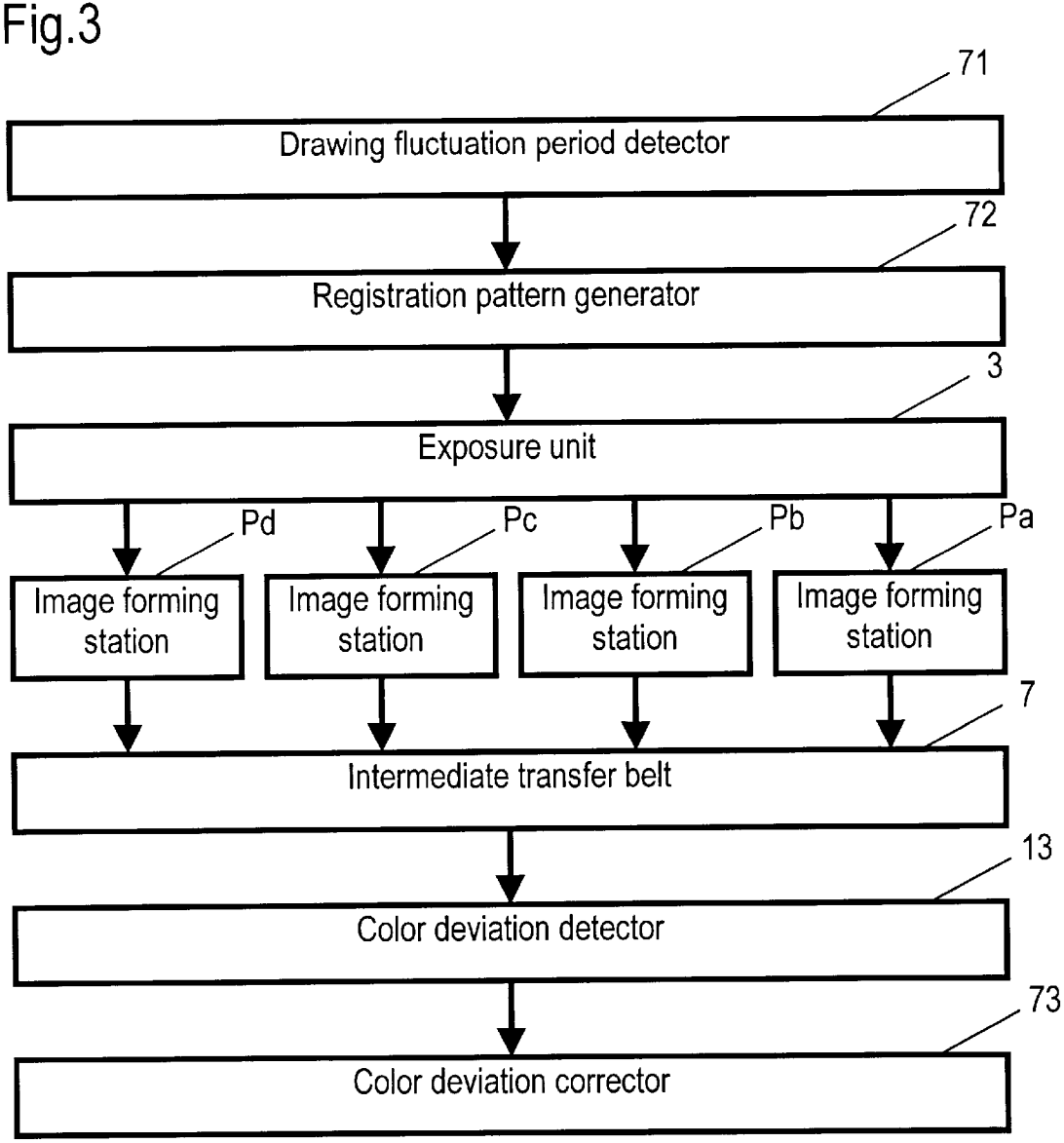

COLOR IMAGE FORMING APPARATUS

This application is a continuation of U.S. patent application Ser. No. 09/515,182, filed Feb. 29, 2000, U.S. Pat. No. 6,188,418.

FIELD OF THE INVENTION

The present invention relates to a color image forming apparatus having a color deviation detecting function in a registration mechanism of color image forming apparatus of tandem engine type.

BACKGROUND OF THE INVENTION

In a conventional image forming apparatus of electrophotographic type, a uniform electric charge of about 1 millicoulomb per square centimeter is applied on the surface of a photosensitive drum. This surface of a photosensitive drum is exposed depending on the image information, and the electric charge of its irradiated portion only is released to the photosensitive drum substrate, and an image (electrostatic latent image) is formed as a result of distribution of electric charge. This electrostatic latent image is developed by coloring charged particles (toner particles), and a powder image is formed (toner development). The powder image is transferred onto a sheet material or the like. The transferred powder image is fused and fixed by heat or other energy, and an image is formed.

Recently, on the other hand, the image by the image forming apparatus of electrophotographic type is becoming colorful. As the color image forming apparatus, a color image forming apparatus of tandem engine type is proposed. This color image forming apparatus includes a plurality of image forming stations having a photosensitive drum. The plurality of image forming stations are image forming stations for forming cyan image, magenta image, yellow image, and, preferably, black image on each photosensitive drum. The powder image formed on each photosensitive drum is overlaid on an intermediate transfer material at transfer position of each color powder image, and transferred and synthesized. In the color image forming apparatus of tandem engine type, the image can be formed at high speed because each image is formed parallel in each color.

In the case of color image forming apparatus, however, each powder image formed in a different image forming station may be deviated in position due to positioning error between image forming stations, resulting in color deviation. To develop a color image forming apparatus of high quality, such color deviation is a serious problem, and the technique for correcting color deviation (registration) is required.

FIG. 8 is a block diagram of a conventional color image forming apparatus, and FIGS. 9A, B, C, D, E are diagrams showing types of color deviation in a general color image forming apparatus.

As shown in FIG. 8, a conventional color image forming apparatus comprises four image forming stations Pa, Pb, Pc, Pd arranged parallel in contact with the top of an intermediate transfer belt 7 which is rotated by drive rollers 14a, 14b. Each image forming station has photosensitive drums 1a, 1b, 1c, 1d contacting with the intermediate transfer belt 7 mounted on the color image forming apparatus main body respectively. Around the photosensitive drums 1a, 1b, 1c, 1d, chargers 2a, 2b, 2c, 2d are disposed for providing each photosensitive drum with an electrostatic charge. On the top of the image forming stations Pa, Pb, Pc, Pd, there is an exposure unit 3 which is a scanning optical system for forming an electrostatic latent image by exposing the light depending on the image information to the photosensitive drums 1a, 1b, 1c, 1d charged by the charger unit. The exposure unit 3 includes an exposure unit 3K for the photosensitive drum 1a, an exposure unit 3C for the photosensitive drum 1b, an exposure unit 3M for the photosensitive drum 1c, and an exposure unit 3Y for the photosensitive drum 1d. A color deviation detector 13 is disposed near the drive roller 14a.

Each one of the photosensitive drums 1a, 1b, 1c, 1d is surrounded by:
- developing units 4a, 4b, 4c, 4d for developing the electrostatic latent image formed by exposure by coloring toner particles, and forming a powder image,
- transfer units 5a, 5b, 5c, 5d for transferring and synthesizing by overlaying each powder image formed by the developing units 4a, 4b, 4c, 4d on the intermediate transfer belt 7 at the transfer position of each color powder image, and
- cleaning units 6a, 6b, 6c, 6d for cleaning and removing the residual toner particles on the surface of the photosensitive drums 1a, 1b, 1c, 1d after the powder images are transferred on the intermediate transfer belt 7 by the transfer units 5a, 5b, 5c, 5d.

The intermediate transfer belt 7 moves in the direction of arrow A shown in FIG. 8, and the photosensitive drums 1a, 1b, 1c, 1d rotate in the direction of arrow B shown in FIG. 8 without sliding on the intermediate transfer belt 7.

In the conventional color image forming apparatus having such constitution, the image forming operation is described below.

First, at the image forming station Pa, the surface of the photosensitive drum 1a is uniformly charged with an electrostatic charge by the charger 2a.

An electrostatic latent image corresponding to the image information of black component is formed on the photosensitive drum 1a by the exposure unit 3K.

This electrostatic latent image is developed on the photosensitive drum 1a as a powder image by black toner particles by the developing unit 4a.

This powder image is transferred on the intermediate transfer belt 7 as a black toner image by the transfer unit 5a.

The surface of the photosensitive drum 1a after transfer process is cleaned by the cleaning unit 6a, and residual toner particles are removed to be ready for next image formation.

Parallel to the timing of forming the black toner image, at the image forming station Pb, the surface of the photosensitive drum 1b is uniformly charged with an electrostatic charge by the charger 2b, and An electrostatic latent image corresponding to the image information of cyan component is formed on the photosensitive drum 1b by the exposure unit 3C.

This electrostatic latent image is developed on the photosensitive drum 1b as a powder image by cyan toner particles by the developing unit 4b, and It is laid over the black toner image formed on the intermediate transfer belt 7, and a synthetic toner image is formed.

Similarly, thereafter, a magenta toner image is overlaid by the image forming station Pc, and a yellow toner image by the image forming station Pd sequentially on the intermediate transfer belt 7. In this way, the synthetic toner image is formed by overlaying four color toner images on the intermediate transfer belt 7.

After completion of formation of the synthetic toner image, a sheet material 9 of paper or the like is supplied in between the intermediate transfer belt 7 and a transfer roller 11 from a paper feed cassette 10 through a paper feed roller 8. The transfer roller 11 is disposed at a position contacting with the intermediate transfer belt 7 for inserting the sheet material 9 between it and the intermediate transfer belt 7. When the sheet material 9 is supplied, the synthetic toner image is transferred on the sheet material 9. Then, after being heated and fixed by a fixing unit 12, a color image is formed on the sheet material 9.

In such image forming apparatus of tandem engine type, however, color deviation n may occur in the following cases:
1) Unstable temperature when turning on the power.
2) Exchange of image forming stations Pa, Pb, Pc, Pd.
3) Setting condition of the image forming apparatus.
4) Deviation of mounting of the image forming stations Pa, Pb, Pc, Pd and scanning optical system due to temperature changes in the apparatus.

FIGS. 9A to E depict modes of color deviation.

FIG. 9A shows deviation of sub-scanning position by moving parallel to the moving direction A of the intermediate transfer belt 7. In the diagram, Ra indicates a correct position, and Ea shows a deviated position, schematically.

FIG. 9B shows deviation of main scanning position by moving parallel to the scanning direction of the exposure unit 3 (the direction vertical to the moving direction A of the intermediate transfer belt 7). In the diagram, Rb indicates a correct position, and Eb shows a deviated position, schematically.

FIG. 9C shows a skew error of the image inclined obliquely to the scanning direction of the exposure unit 3. In the diagram, Rc indicates a correct position, and Ec shows a deviated position, schematically.

FIG. 9D shows a magnification error of deviation of magnification factor of the exposure unit 3 in the scanning direction among the image forming stations Pa, Pb, Pc, Pd. In the diagram, Rd indicates a correct position, and Ed shows a deviated position, schematically.

FIG. 9E shows a curvature error of the image curving in the scanning direction of the exposure unit 3. In the diagram, Re indicates a correct position, and Ee shows a deviated position, schematically.

Main factors of color deviation shown in FIG. 9A and FIG. 9B include deviation of mounting of image forming stations Pa, Pb, Pc, Pd and exposure unit 3, and deviation of mounting of lens and mirror (not shown) for composing the scanning optical system of the exposure unit 3. Main factors of color deviation shown in FIG. 9C include deviation of mounting angle of rotary shafts of photosensitive drums 1a, 1b, 1c, 1d of the image forming stations Pa, Pb, Pc, Pd, and deviation of mounting angle of the exposure unit 3. Main factors of color deviation shown in FIG. 9D include the error of optical path length from the scanning optical system of the exposure units 3K, 3C, 3M, 3Y to the surface of the photosensitive drums 1a, 1b, 1c, 1d. Main factors of color deviation shown in FIG. 9E include deviation of mounting of lens and mirror (not shown) for composing the scanning optical system of exposure units 3K, 3C, 3M, 3Y.

Accordingly, when turning on the power source, when exchanging the image forming stations, or when the temperature varies in the apparatus, it is required to correct color deviation for matching the position of color images depending on the extent of deviation.

The correction is carried out in the following procedure:
A reference pattern (called registration pattern hereinafter) is marked preliminary on the intermediate transfer belt 7;
The registration pattern is detected by a color deviation detector 13 composed of a plurality of sensors;
Extents of five types of color deviation are calculated from the results of detection; and The color deviation is corrected by matching the position of each color image depending on the extent of deviation.

The operation of color deviation detection and color deviation correction of the conventional color image forming apparatus is described below while referring to FIGS. 10, 11, 12, and 13.

FIG. 10 is a block diagram of a conventional color deviation detector. FIG. 11 is a configuration of the registration pattern and position deviation detector on the conventional intermediate transfer belt. FIG. 12 is a diagram showing a configuration of the registration pattern and position deviation detector on the conventional intermediate transfer belt, and an output signal of the color deviation detector.

In FIG. 10, the color deviation detector 13 disposed on the intermediate transfer belt 7 for detecting deviation of position of the registration pattern is composed of:
a light source 31 such as lamp and laser,
a sensor 33, being a charge coupled device (CCD) used as an image sensor for detecting registration pattern, and
a lens 32 for focusing the image of the registration pattern illuminated by the light source 31 on the sensor 33.

The color deviation detector 13 consists of two color deviation detectors (13a and 13b) disposed near the scanning start position and near the scanning end position of the exposure unit 3. The sensors of the two color deviation detectors 13a, 13b are arranged on a line orthogonal to the moving direction A of the intermediate transfer belt 7 as shown in FIG. 11.

The patterns 34, 35, 36, 37 as shown in FIG. 11 are toner images of predetermined lines and figures transferred on the intermediate transfer belt 7 in each color at predetermined intervals by the image forming operation.

In such constitution, the color deviation detecting operation is to measure the extent of position deviation (color deviation) of the toner images 34, 35, 36, 37 of each color transferred on the intermediate transfer belt 7 as shown in FIG. 11 by the color deviation detector 13a and color deviation detector 13b.

Concerning deviation of sub-scanning position shown in FIG. 9A, as shown in FIG. 12A, position deviation $\Delta Y1$ ($\Delta Y1 = \Delta T1 \cdot v$) of each color is calculated from the time difference $\Delta T$ ($\Delta T1 = T - T1$) between the passing time T1 of the registration pattern of each color on the intermediate transfer belt 7 through the CCD 33a in the color deviation detector 13a and the predetermined design value T, and the moving speed v of the intermediate transfer belt 7.

Concerning deviation of main scanning position shown in FIG. 9B, as shown in FIG. 13A, position deviation of each color is calculated from the pixel position difference $\Delta X1$ when the scanning start position of the registration pattern of each color on the intermediate transfer belt 7 passes through the CCD 33a in the color deviation detector 13a.

Concerning skew error shown in FIG. 9C, as shown in FIG. 12B, skew error $\Delta Y2$ ($\Delta Y2 = \Delta T2 \cdot v$) of each color is calculated from the time difference ($\Delta T2$) of the registration pattern of the same color on the intermediate transfer belt 7 passing through the CCD 33a and CCD 33b in the color deviation detector 13a and color deviation detector 13b, and the moving speed v of the intermediate transfer belt 7.

Concerning magnification error shown in FIG. 9D, as shown in FIG. 13A and FIG. 13B, magnification error ($\Delta X3 = \Delta X2 \cdot \Delta X1$) of 15 each color is calculated from the pixel position difference ($\Delta X2$, $\Delta X1$) of the scanning start position and scanning end position of the registration pattern of the same color on the intermediate transfer belt 7 passing through the CCD 33a and CCD 33b in the color deviation detector 13a and color deviation detector 13b.

Concerning curvature error shown in FIG. 9E, it is not possible to measure accurately by the conventional color deviation detecting operation. Therefore, there is no other method of decreasing the curvature error than the method of improving the assembling precision of the lens and others in the exposure unit 3.

Depending on the four types of color deviation extent detected in the procedure herein, the color deviation correcting operation is carried out as follows.

FIG. 14 is a block diagram of a color deviation correcting mechanism of the scanning optical system in the exposure unit in the prior art.

In FIG. 14, the scanning optical system of the exposure unit 3 disposed on the photosensitive drum 1 comprises:

- a polygon motor 61,
- a polygon mirror 62 mounted on the shaft of the polygon motor 61,
- a pair of folded mirrors 63, 64 capable of moving freely in the longitudinal and lateral direction by an adjusting actuator 66 and an adjusting actuator 67, with the mirror surfaces held at a right angle, and
- a folded mirror 65 for finally emitting the scanning beam to the photosensitive drum 1.

The adjusting actuator 66 moves the folded mirrors 63, 64 horizontally in the longitudinal direction (direction of arrow C in FIG. 14). The adjusting actuator 67 moves the folded mirrors 63, 64 in the vertical direction (direction of arrow D in FIG. 14). As actuators for these adjustments, linear step actuators having step motors as the drive source for moving linearly in gradual steps are used. The image data is optically modulated by a semiconductor laser (not shown), and fed into the polygon mirror 62. The scanning beam reflected by the polygon mirror 62 is sequentially reflected by the folded mirrors 63, 64, 65, and is emitted to the surface of the photosensitive drum 1. The irradiation position of the scanning beam is controlled by the polygon motor 61, adjusting actuator 66, and adjusting actuator 67 which are driven independently.

The sub-scanning position deviation shown in FIG. 9A and main scanning position deviation shown in FIG. 9B are corrected by the timing correction of scanning start of the exposure unit 3 of each color, phase control of timing signal of scanning start, and phase control of polygon motor. The skew error shown in FIG. 9C and magnification error shown in FIG. 9D are corrected by adjustment of irradiation position and adjustment of optical path length by the adjusting actuator 66 and adjusting actuator 67.

In the conventional constitution, however, due to eccentricity of the drive unit of the intermediate transfer belt, shaft run-out of the drive unit, or meandering of intermediate transfer belt, the toner image transfer position on the intermediate transfer belt is not moving at uniform speed (zero acceleration). Accordingly, the position of the toner image transferred on the intermediate transfer belt is not constant. Therefore, the registration pattern for inspecting the color deviation amount is transferred in a deviated state, and thereby the registration pattern oscillates.

When such registration pattern is used in detection of extent of color deviation, an extent of color deviation different from the actual status is detected. As a result, in spite of correction, to the contrary, the color deviation amount may be increased to lower the print quality.

Generally, color deviation consists of:

1) DC component occurring any time due to mounting error of intermediate transfer belt or the like, and
2) AC component occurring periodically due to uneven rotation of photosensitive drum or the like:; and usually these two factors are mixed to cause color deviation.

The color deviation AC component occurs periodically (without scattering) like the sine curve, and the DC component is a color deviation occurring any time.

If the DC component is detected at the position largest in the amount of the AC component, the sum of AC component deviation + DC component deviation is detected, and accurate deviation of DC component cannot be measured.

Herein, seeing that the AC component occurs alternately in the plus direction and minus direction, with a periodic rebound, the AC component can be canceled by determining the period of AC component, measuring DC component plural times in the period, and averaging.

As a result, effects of AC components are eliminated, and an accurate DC component can be calculated.

That is, it is an object of the invention to present a color image forming apparatus capable of obtaining images of high print quality, by eliminating only AC components from the mixed color deviation of AC components and DC components, detecting the DC components, drawing the registration pattern at high precision, and correcting the color deviation accurately by the registration pattern drawn at high precision.

The invention is devised to solve the above problems, and hence provides a color image forming apparatus capable of correcting the color deviation accurately and obtaining images of high print quality, by drawing the registration pattern at high precision.

SUMMARY OF THE INVENTION

To solve the problems, the color image forming apparatus of the invention comprises:

a) an image conveying unit for conveying an image by holding it on the surface, b) a plurality of image forming units disposed for each color for forming the image corresponding to each color image information on the image conveying unit, c) a registration pattern generator for controlling formation of registration pattern of each color on the image conveying unit by the image forming units at the time of detection operation of color deviation, d) a color deviation detector for detecting color deviation of the image from the registration pattern, and e) a conveying drawing fluctuation period detector for detecting period of drawing fluctuation in the image conveying unit.

In this constitution, when forming the registration pattern, registration pattern is formed plural times at an arbitrary position in the period determined by the conveying drawing fluctuation period detector. The average of the color deviation values obtained from the plural registration patterns is obtained as the color deviation amount, so that a more accurate color deviation can be detected. By detecting the more accurate color deviation, the precision of correction of color deviation is enhanced. As a result, the color image forming apparatus capable of obtaining images of high print quality is presented.

BRIEF DESCRIPTION OF THE DRAWINGS

FIG. 3 is a function block diagram of the color image forming apparatus in the embodiment of the invention.

DETAILED DESCRIPTION OF THE PREFERRED EMBODIMENTS

The color image forming apparatus according to embodiments 1 to 9 of the invention is described below while referring to the accompanying drawings.

Embodiment 1

Figure 1:
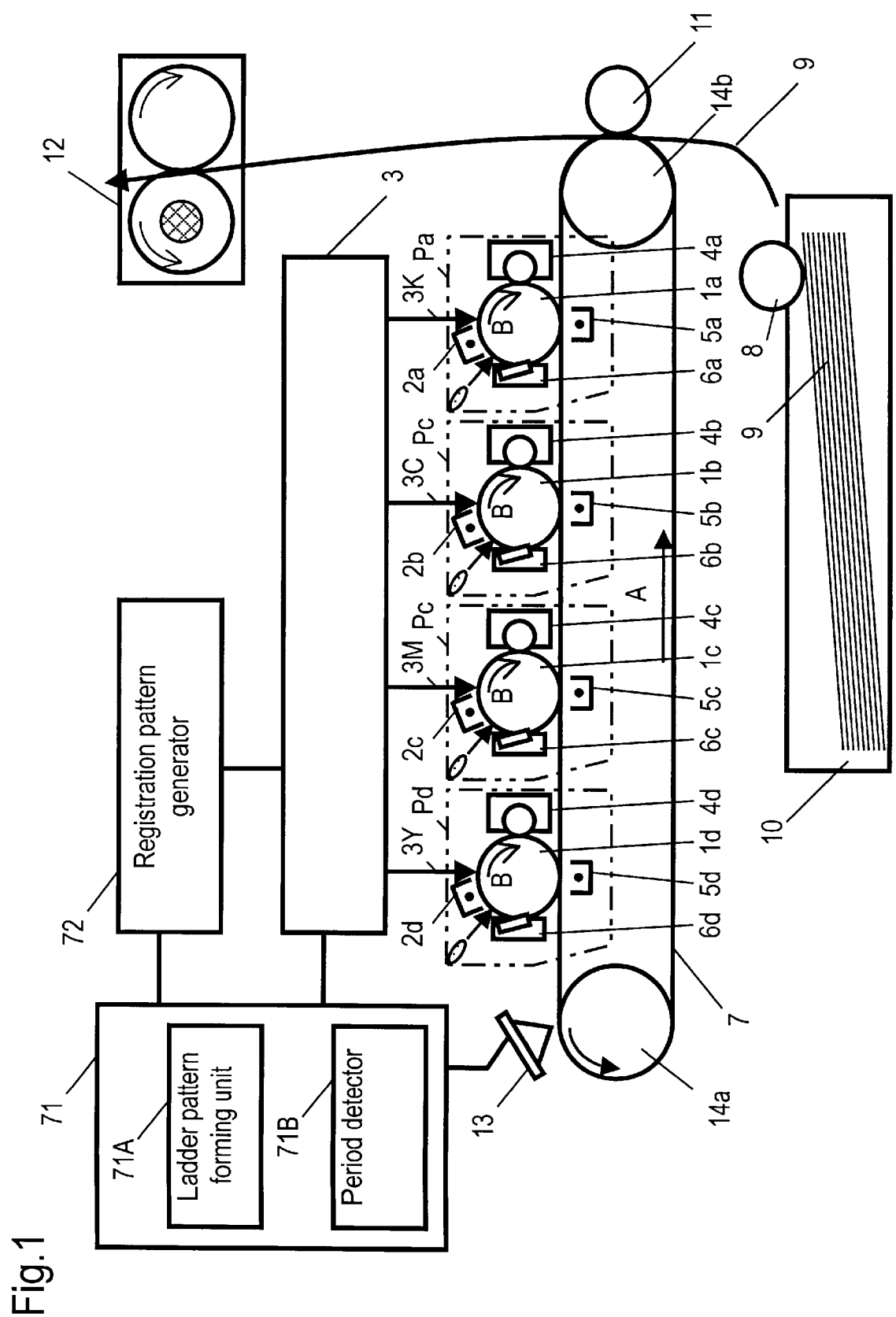
FIG. 1 is a block diagram of a color image forming apparatus in an embodiment of the invention.
Figure 2:
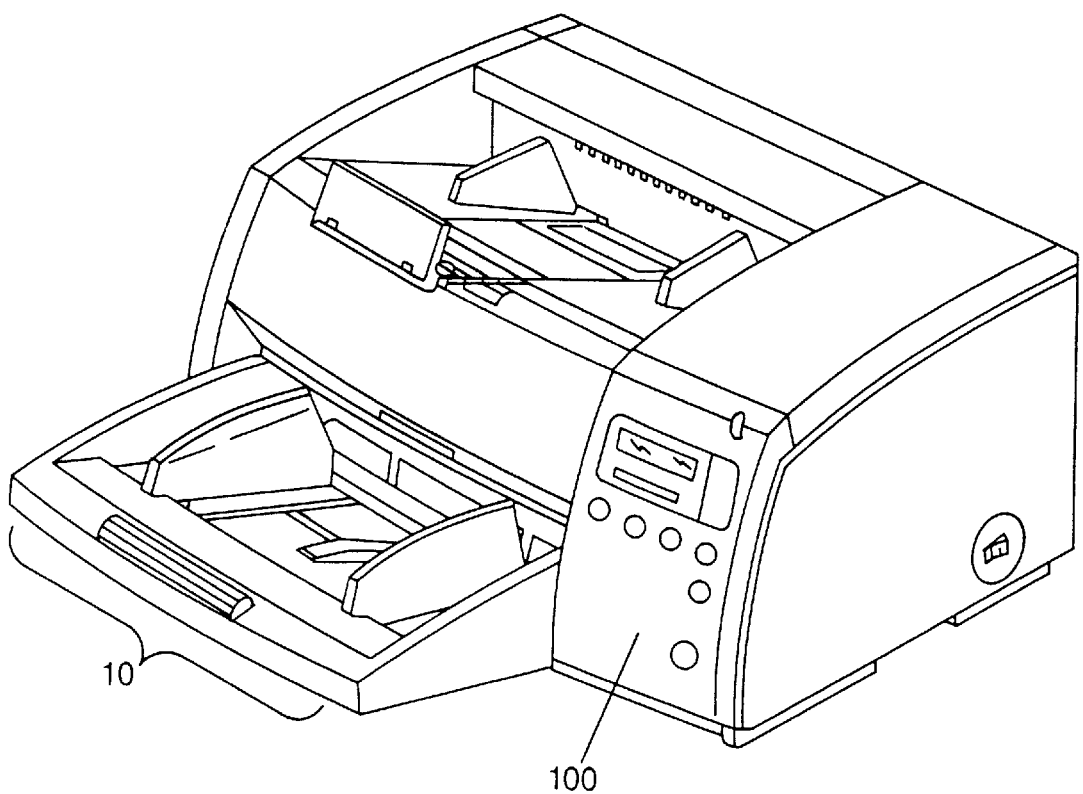
FIG. 2 is an outline drawing of the color image forming apparatus in the embodiment of the invention.
Figure 8:
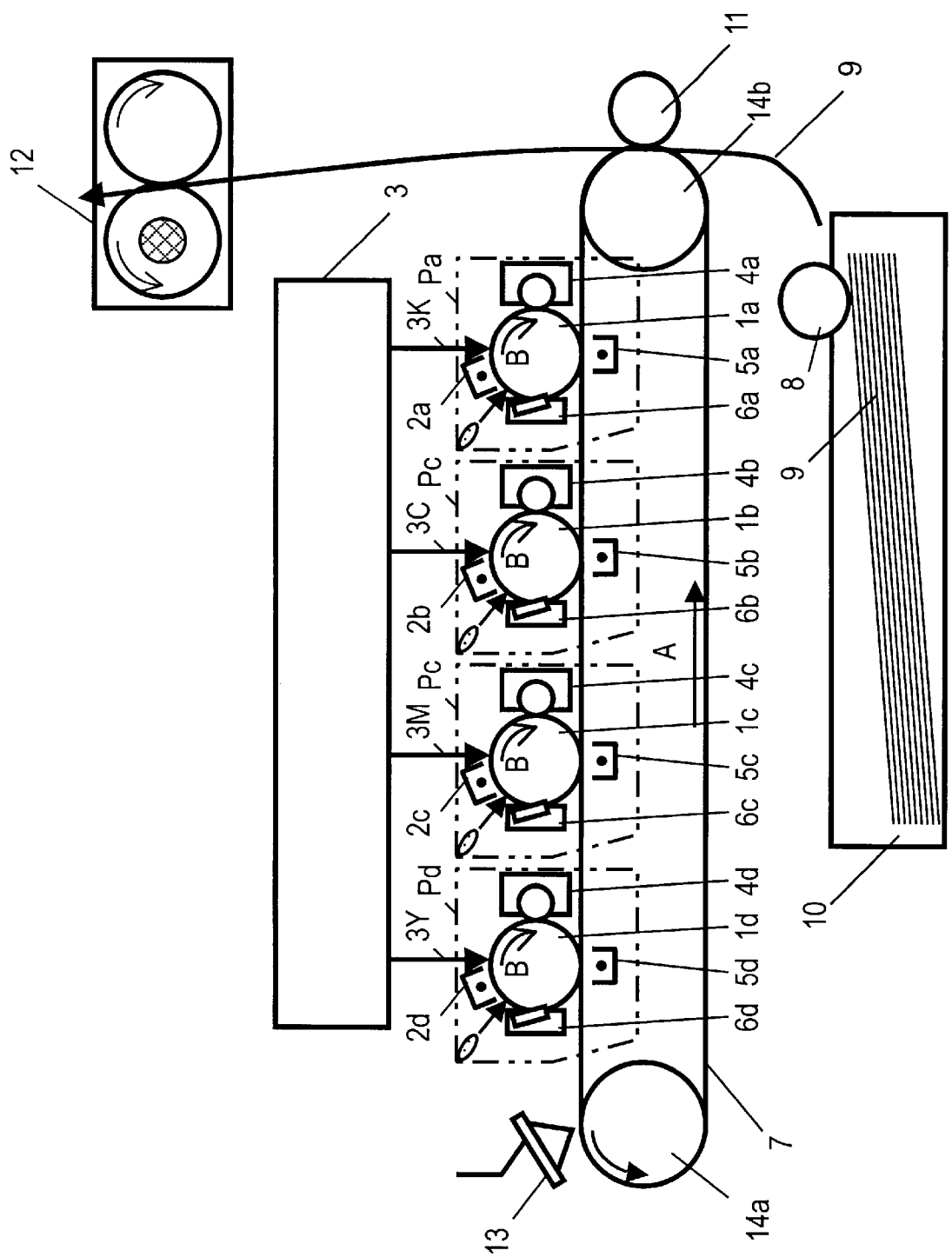
FIG. 8 is a block diagram of a conventional color image forming apparatus.

FIG. 1 shows a constitution of a color image forming apparatus in this embodiment, and FIG. 2 is an outline drawing of the color image forming apparatus in FIG. 1. FIG. 3 is a function block diagram of the color image forming apparatus in the embodiment of the invention. In the color image forming apparatus of the embodiment, same parts as in the prior art in FIG. 8 are identified with same reference numerals, and their description is omitted.

It is explained below by referring to FIG. 1 and FIG. 3. This embodiment is similar to the conventional constitution shown in FIG. 8, except that a conveying drawing fluctuation period detector 71 and a registration pattern generator 72 are added.

The conveying drawing fluctuation period detector 71 is composed of:

a ladder pattern forming unit 71A for forming a ladder pattern of uniform interval and uniform width, and a period detector 71B for determining the transition of period and extent of drawing fluctuation by measuring the ladder pattern formed on the intermediate transfer belt 7.

The ladder pattern formed by the ladder pattern forming unit 71A is formed on the intermediate transfer belt 7 in the same procedure as in the conventional registration pattern formation. The period detector 71B detects the conveying fluctuation by the same procedure as in the conventional color deviation detector 13, and the transition of period and extent of drawing fluctuation is determined by the frequency analysis technique such as Fourier analysis.

The transition of period and extent of drawing fluctuation is detected in each color.

Figure 9A:
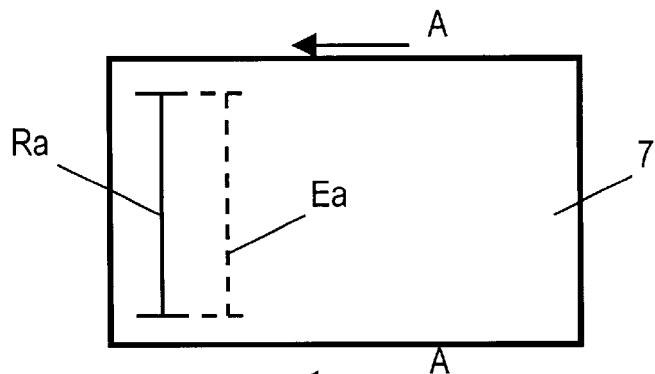
FIGS. 9A, B, C, D, and E are diagrams showing various types of color deviation in a general color image forming apparatus.
Figure 9B:
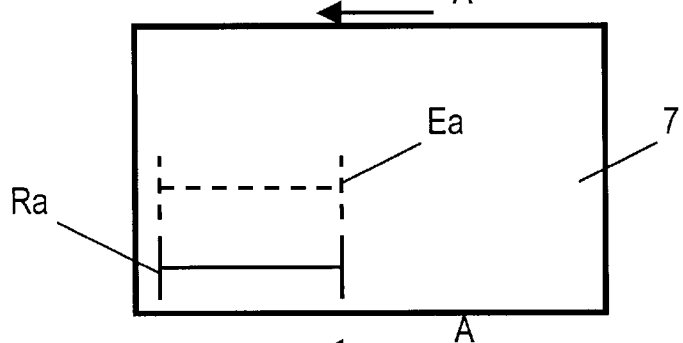
Figure 9C:
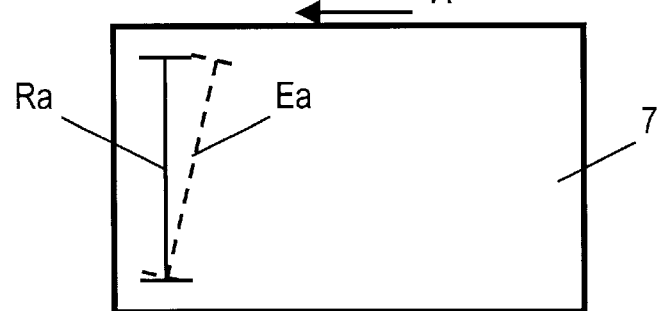
Figure 9D:
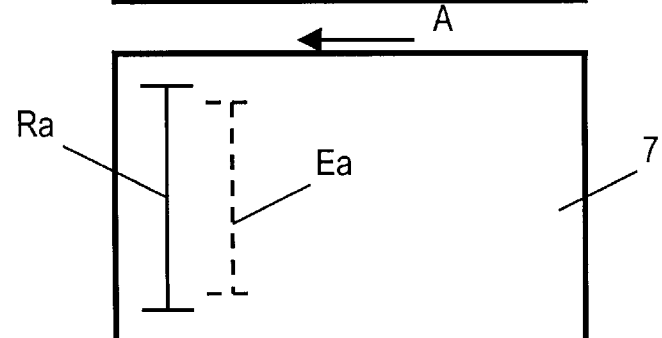
Figure 9E:
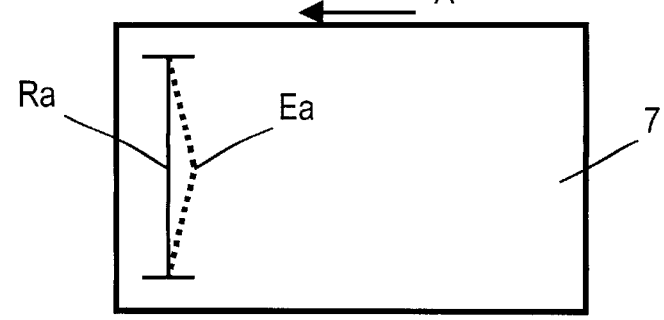

The registration pattern generator 72 controls the exposure unit 3 for forming electrostatic latent images on the photosensitive drums 1$a$, 1$b$, 1$c$, 1$d$ for forming the registration pattern. The color deviation detector 13 detects the extent of position deviation (color deviation) of each color toner image formed on the intermediate transfer belt 7 by the individual color image forming stations Pa, Pb, Pc, Pd. A color deviation corrector 73 corrects color deviation corresponding to the color deviation detected by the color deviation detector 13 as shown in FIGS. 9A, B, C, and D.

Figure 10:
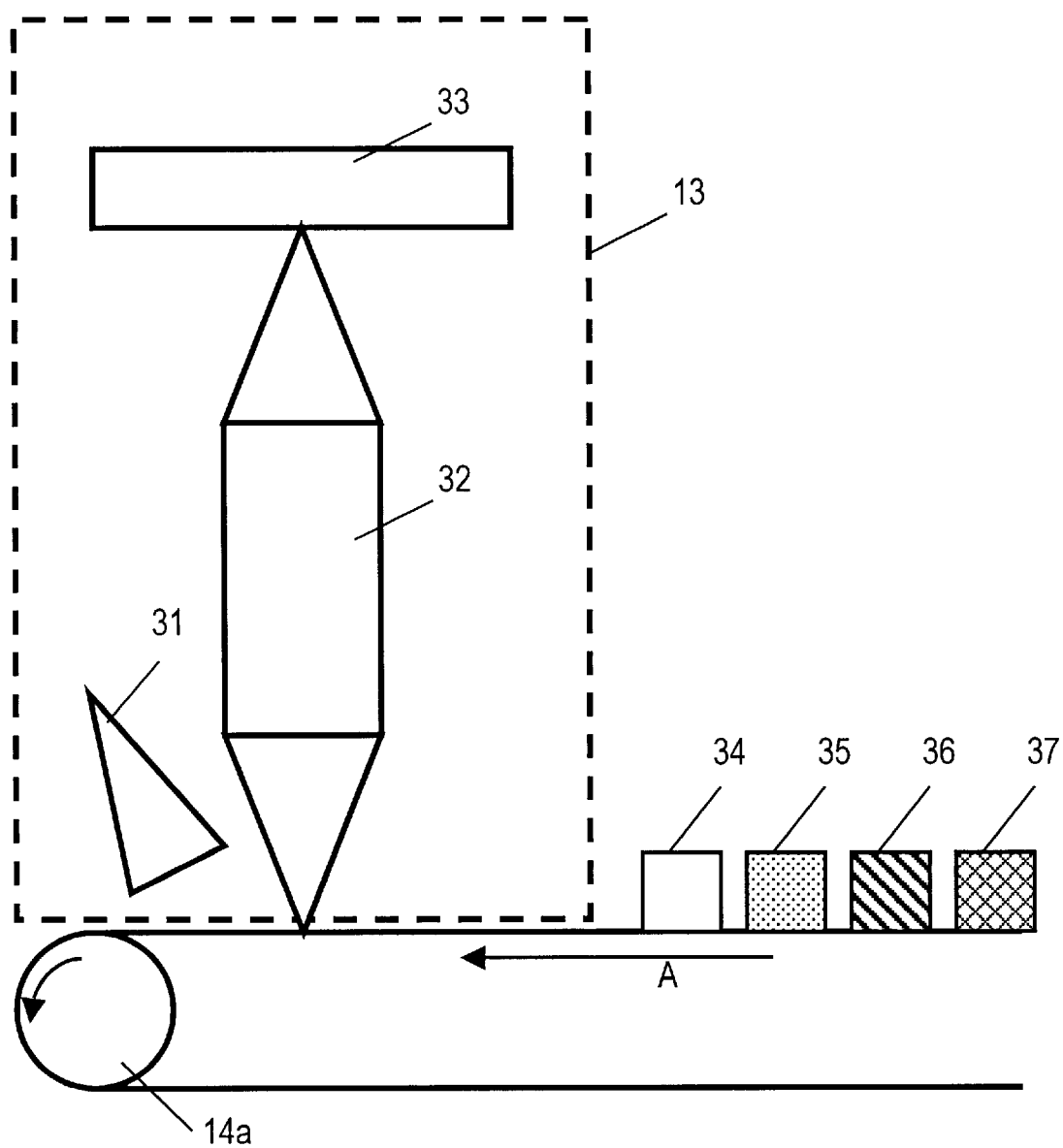
FIG. 10 is a block diagram of a conventional color deviation detector.
Figure 11:
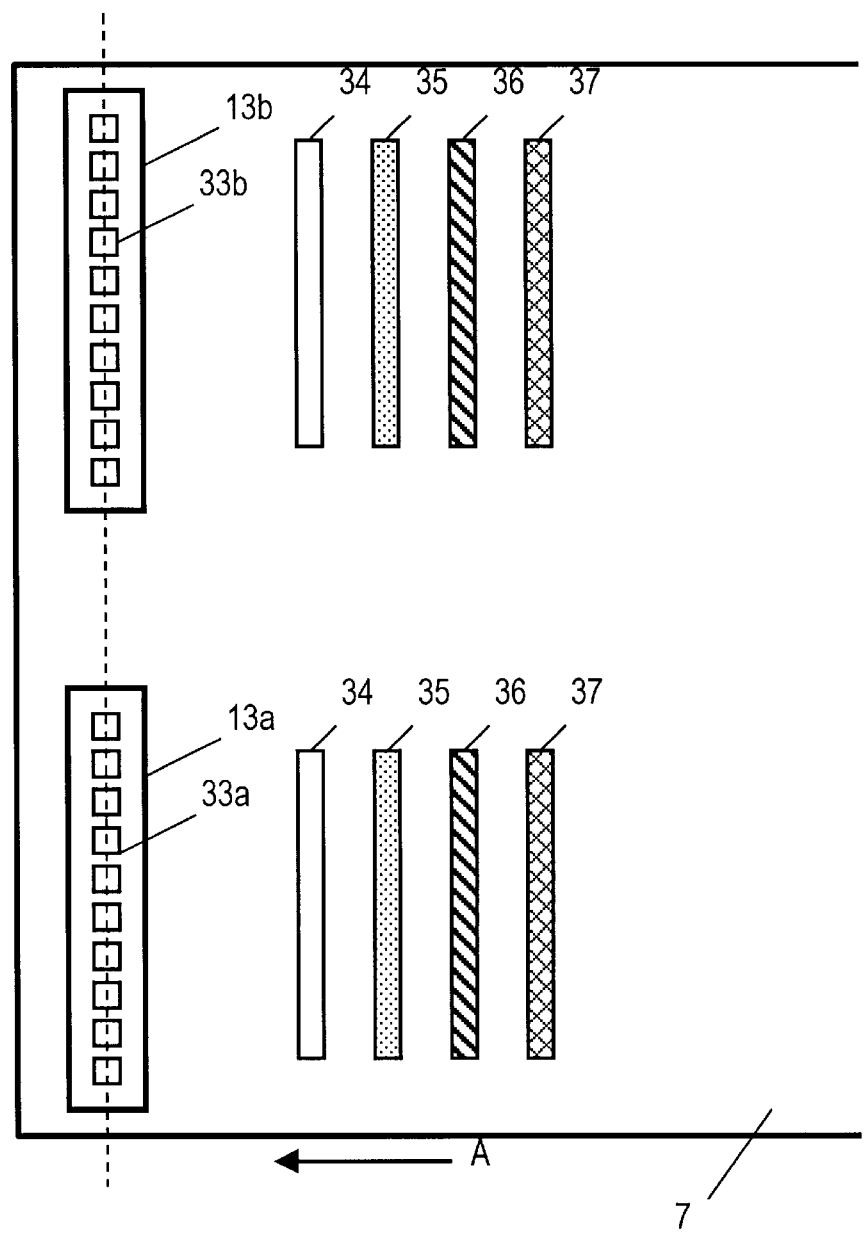
FIG. 11 is a configuration of registration pattern and position deviation detector on a conventional intermediate transfer belt.
Figure 12A:
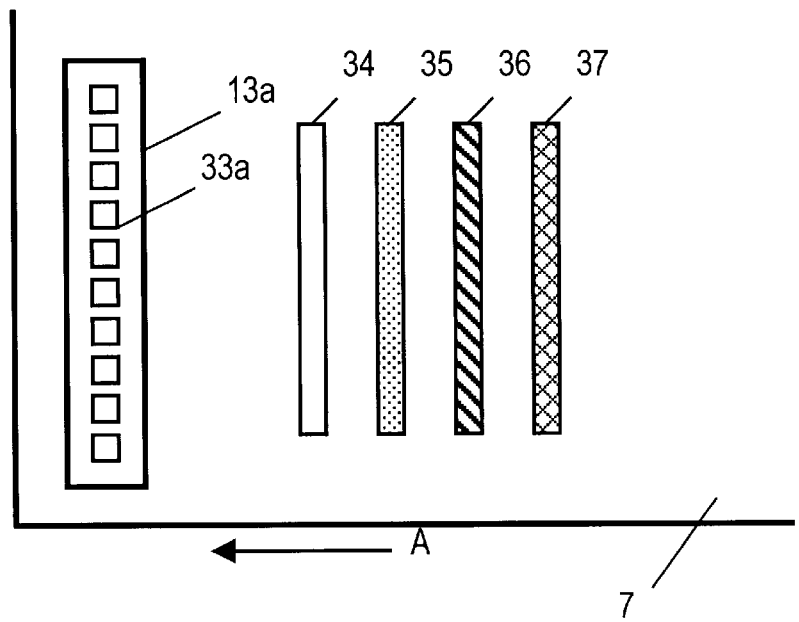
FIG. 12A is a configuration of registration pattern and position deviation detector on a conventional intermediate transfer belt.
Figure 12B:
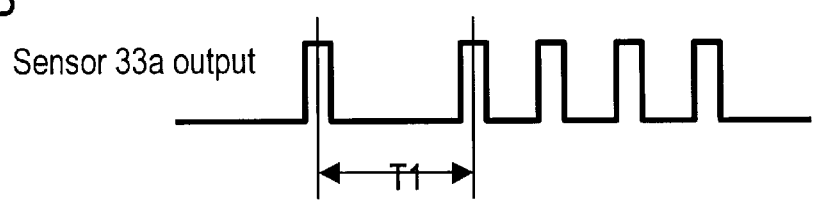
FIG. 12B is a diagram showing an output signal of a color deviation detector in FIG. 12A.
Figure 12C:
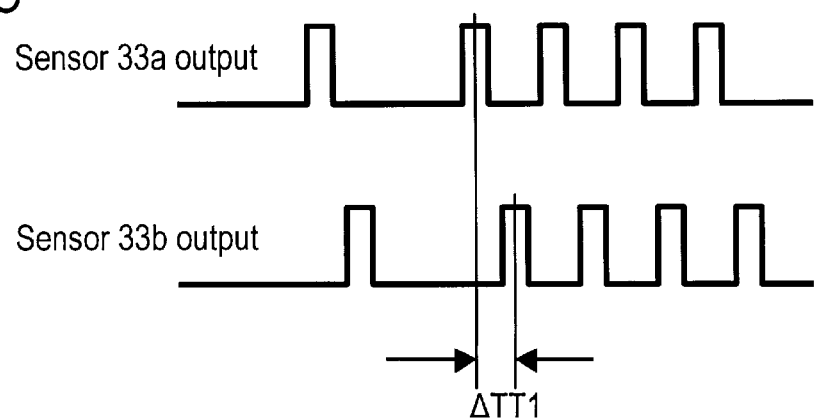
FIG. 12C is a diagram showing output signals of a sensor 13$a$ and a sensor 13$b$ of the color deviation detector in FIG. 12A.
Figure 13A:
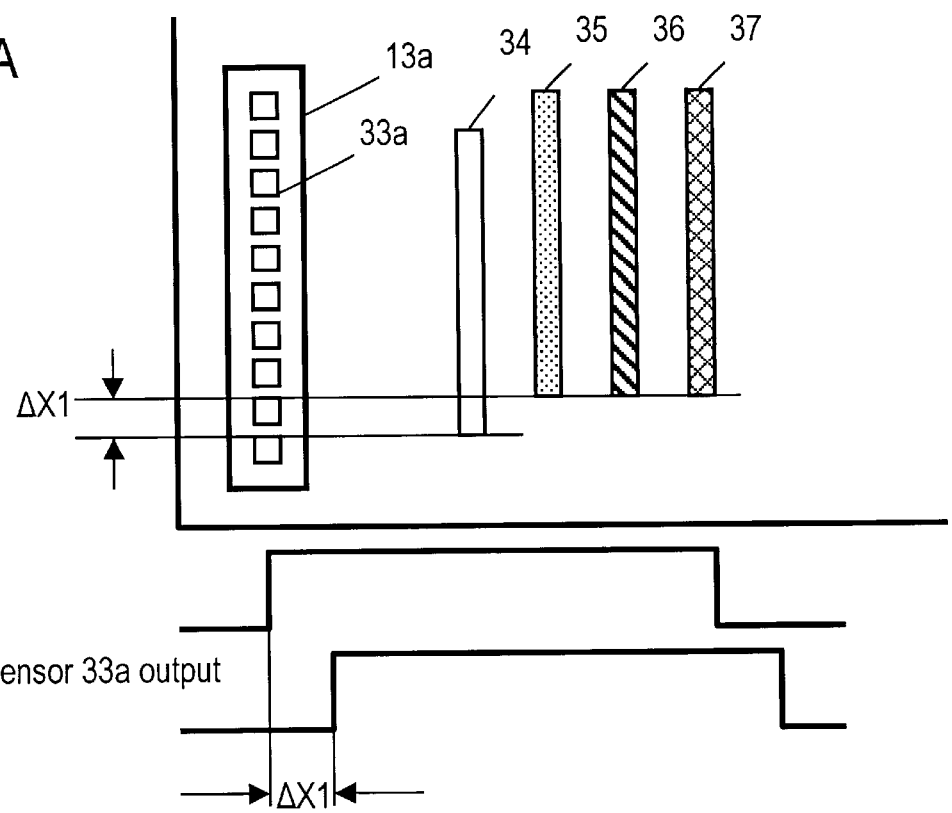
FIG. 13A is a configuration of registration pattern and position deviation detector on a conventional intermediate transfer belt.
Figure 13B:
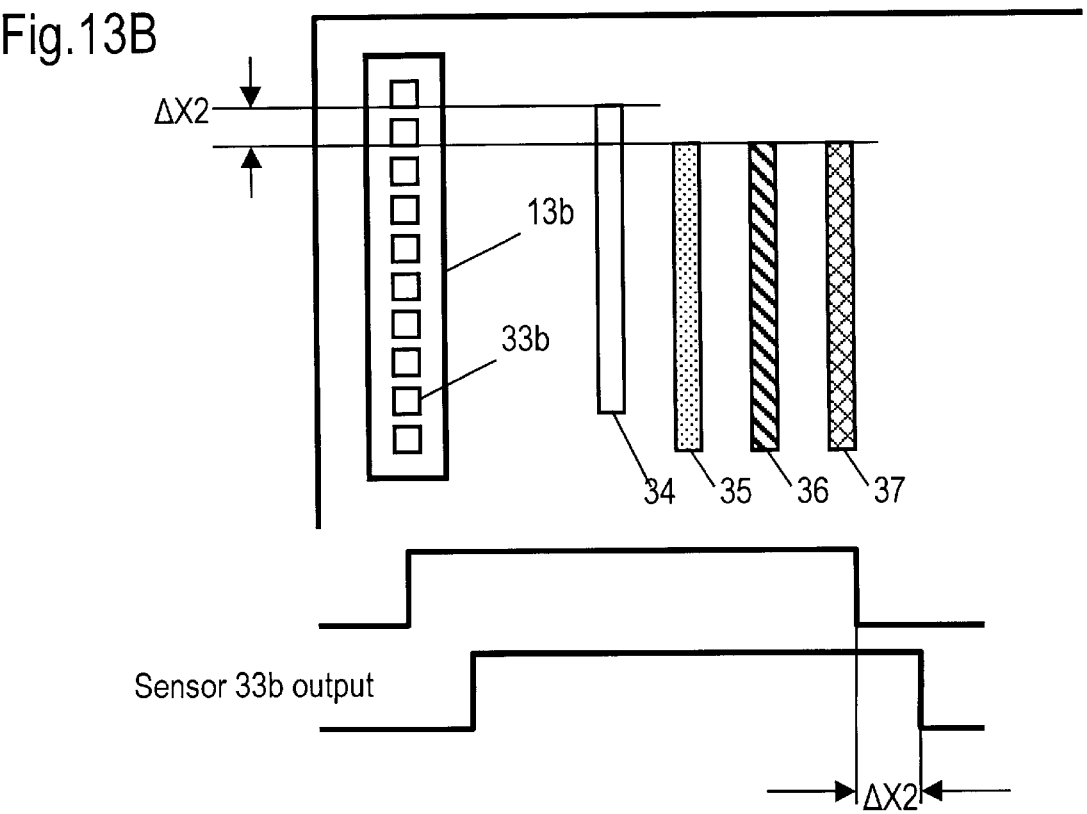
FIG. 13B is a diagram showing an output signal of a color deviation detector in FIG. 13A.

The color deviation detector 13 is same as the conventional constitution shown in FIG. 10, and description of its constitution and operation is omitted.

Figure 14:
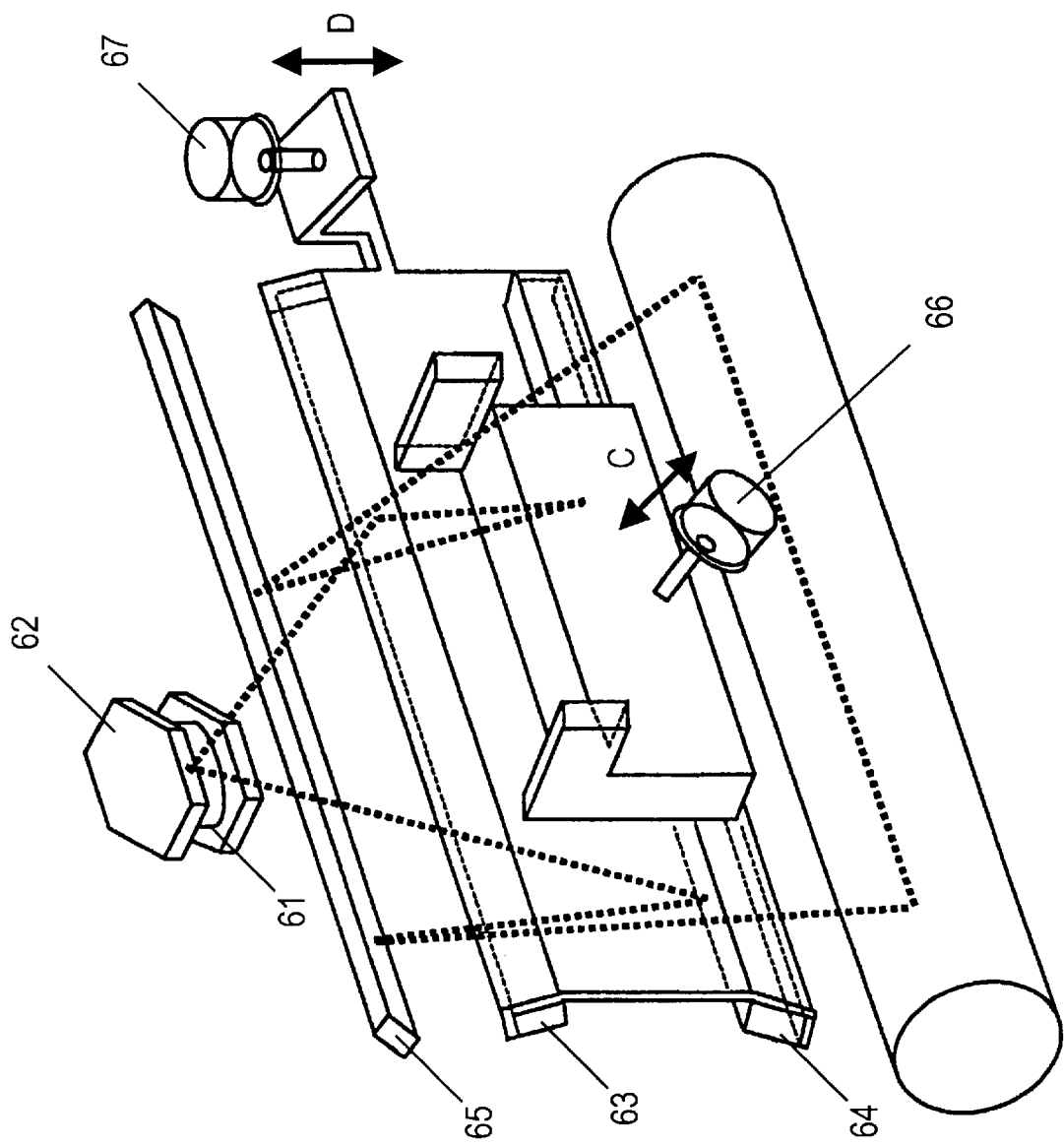
FIG. 14 is a block diagram of color deviation correcting mechanism of the scanning optical system in a conventional exposure unit.

The color deviation corrector 73 is same as the conventional constitution shown in FIG. 14, and description of its constitution and operation is omitted.

Figure 4A:
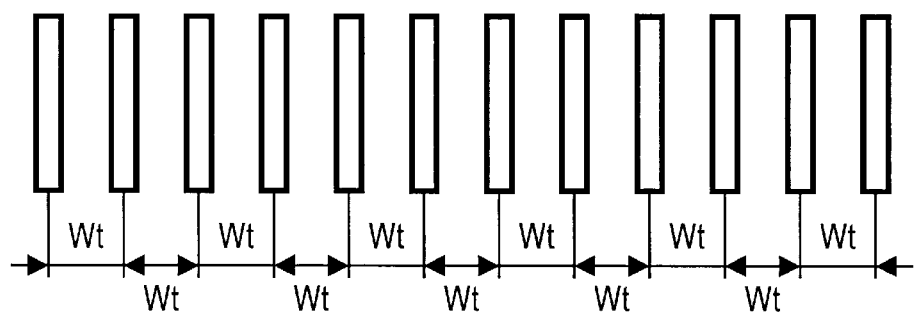
FIG. 4A is an example of ladder pattern for explaining the embodiment of the invention.
Figure 4B:
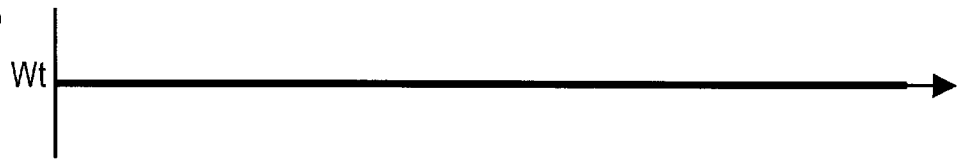
FIG. 4B is a graph showing a case without conveying fluctuation in the time series.
Figure 5A:
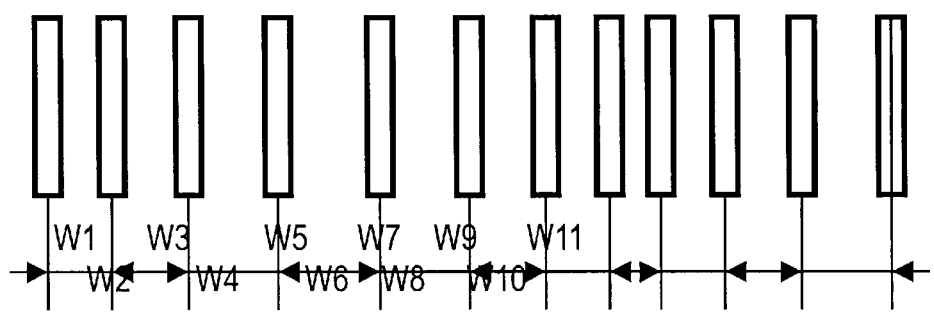
FIG. 5A is a diagram showing a ladder pattern formed on an intermediate transfer belt.
Figure 5B:
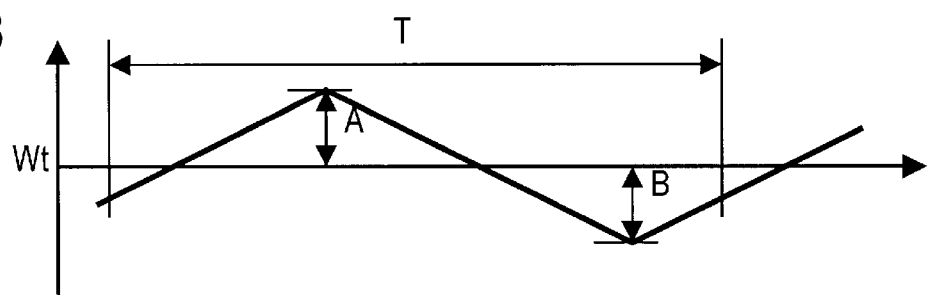
FIG. 5B is a graph showing conveying fluctuation and its period of the ladder pattern in FIG. 5A in the time series.
Figure 5C:
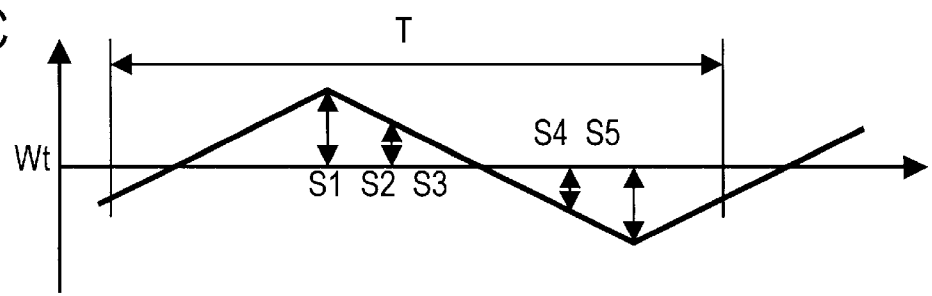
FIG. 5C is a graph showing an example of determining a plurality of sampling positions S1 to S5 in the period T of the ladder pattern in FIG. 5B.

FIG. 4A shows an example of ladder pattern formed by the ladder pattern forming unit. In FIG. 4B, the axis of ordinates X denotes the amount of drawing interval fluctuation due to speed fluctuation or the like at an arbitrary point on the intermediate transfer belt, and the axis of abscissas represents the time. Without drawing fluctuation, for example, by drawing and measuring a ladder pattern with intervals Wt, a graph as shown in FIG. 4B would be obtained. Actually, however, a drawing fluctuation occurs at a specific interval combining the period of the intermediate transfer belt and each constituent element (gear, pulley, etc.) in the drive unit of the photosensitive materials, and the ladder pattern on the intermediate transfer belt is as shown in FIG. 5A. In FIG. 5B, T denotes the period of drawing fluctuation, and A and B are maximum values of fluctuation in the plus direction and minus direction, respectively. Such drawing fluctuations have effects directly also on drawing of the registration pattern, and the registration pattern is drawn in a state deviated by A in the plus direction and B in the minus direction in a worst case. As a result, the color deviation amount includes errors of A to −B from the true deviation. This drawing fluctuation, by nature, does not scatter in the plus direction or minus direction, but appears repeatedly in the plus direction and minus direction, or in one direction only. Accordingly, as shown in FIG. 5C, a plurality of sampling positions S1 to S5 are determined in the period T determined in the conveying drawing fluctuation period detector. At the determined positions, the registration pattern is drawn, and the color deviation detector 13 detects the drawn pattern. By averaging the detected values of the plurality of patterns, the error is controlled at least smaller than A to −B. It is therefore possible to detect the color deviation more precisely. The sampling positions and the number thereof may be set properly depending on the actual state of drawing fluctuation.

Embodiment 2

Figure 6:
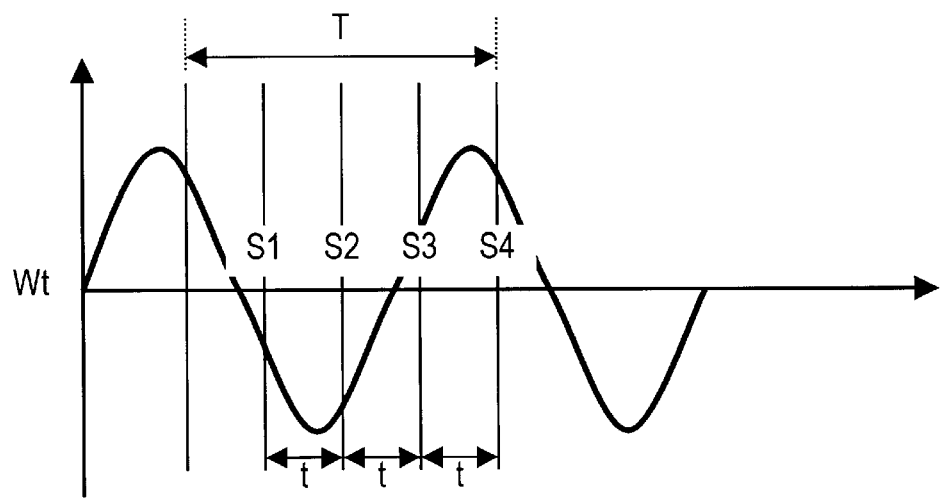
FIG. 6 is a graph showing conveying fluctuation and its period in embodiment 2 of the invention in the time series.

FIG. 6 is a graph showing the conveying fluctuation and its period in the time series in embodiment 2 of the invention.

The apparatus constitution of the image forming unit of the color image forming apparatus in this embodiment is same as in embodiment 1 shown in FIG. 1, and its description is omitted.

The function block diagram of the color image forming apparatus of this embodiment is same as in embodiment 1 shown in FIG. 3, and its description is omitted.

In FIG. 6, the axis of ordinates X denotes the amount of drawing fluctuation due to speed fluctuation or the like at an arbitrary point on the intermediate transfer belt, and the axis of abscissas represents the time.

As shown in FIG. 6, a drawing fluctuation symmetrical in a half period as a typical sine curve may appear. In this case, in particular, the period is equally divided and sampling positions are determined in consideration of its nature. As shown in FIG. 6, the average of the value of sampling position S1 and value of sampling position S3 is 0, and also the average of the value of sampling position S2 and value of sampling position S4 is 0. Accordingly, at the equally divided points of the period T determined in the conveying drawing fluctuation period detector, by drawing the registration pattern and averaging the results of measurement, the color deviation extent can be accurately detected without having effects of the drawing fluctuation.

Embodiment 3

Figure 7:
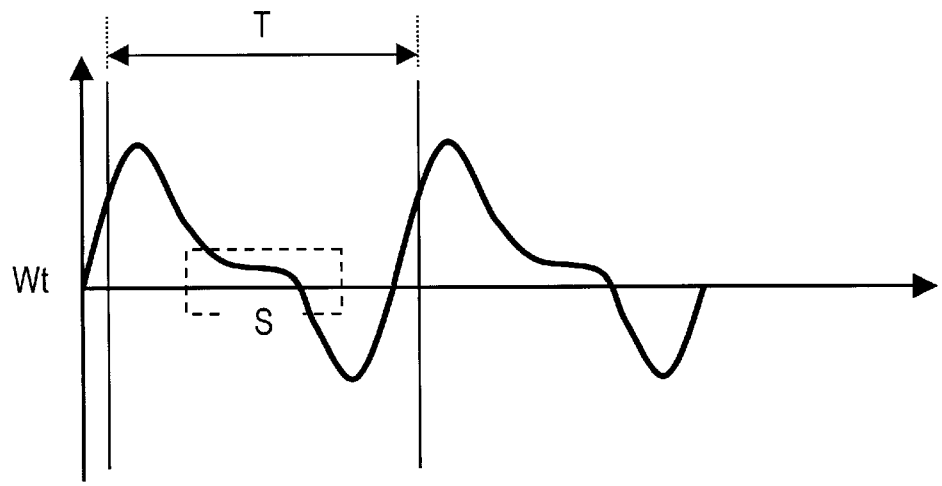
FIG. 7 is a graph showing conveying fluctuation and its period in embodiment 3 of the invention in the time series.

FIG. 7 is a graph showing the conveying fluctuation and its period in the time series in embodiment 3 of the invention.

The apparatus constitution of the image forming unit of the color image forming apparatus in this embodiment is same as in embodiment 1 shown in FIG. 1, and its description is omitted.

The function block diagram of the color image forming apparatus of this embodiment is same as in embodiment 1 shown in FIG. 3, and its description is omitted.

In FIG. 7, the axis of ordinates X denotes the amount of drawing fluctuation due to speed fluctuation or the like at an arbitrary point on the intermediate transfer belt, and the axis of abscissas represents the time. The drawing fluctuation, by nature, does not scatter in the plus direction or minus direction, but appears repeatedly in the plus direction and minus direction, or in one direction only. In other words, there is always a region S of small drawing fluctuation within the period T as shown in FIG. 7. Accordingly, in the region S of small drawing fluctuation in the period determined in the conveying drawing fluctuation period detector, the registration pattern is drawn. Thus, the registration pattern hardly influenced by the drawing fluctuation can be drawn, so that an accurate color deviation amount can be detected.

Embodiment 4

The apparatus constitution of the image forming unit of the color image forming apparatus in this embodiment is same as in embodiment 1 shown in FIG. 1, and its description is omitted.

The function block diagram of the color image forming apparatus of this embodiment is same as in embodiment 1 shown in FIG. 3, and its description is omitted.

The period for composing the drawing fluctuation generally appears in a plurality, but principal periods excluding the noise can be reduced to several ones. Principal periods of drawing fluctuation can be considered as least common multiples of these plurality of periods (not shown). Accordingly, in the periods of the least common multiples of the plurality of principal periods, the registration pattern is drawn in the same manner as in embodiment 1, and the detected values are averaged. Thus, the color deviation amount can be detected at high precision.

Embodiment 5

The apparatus constitution of the image forming unit of the color image forming apparatus in this embodiment is same as in embodiment 1 shown in FIG. 1, and its description is omitted.

The function block diagram of the color image forming apparatus of this embodiment is same as in embodiment 1 shown in FIG. 3, and its description is omitted.

The period for composing the drawing fluctuation generally appears in a plurality, but principal periods excluding the noise can be reduced to several ones. Principal periods of drawing fluctuation can be considered as least common multiples of these plurality of periods (not shown). Accordingly, in the periods of the least common multiples of the plurality of principal periods, the registration pattern is drawn in the same manner as in embodiment 2, and the detected values are averaged. Thus, the color deviation amount can be detected at high precision.

Embodiment 6

The apparatus constitution of the image forming unit of the color image forming apparatus in this embodiment is same as in embodiment 1 shown in FIG. 1, and its description is omitted.

The function block diagram of the color image forming apparatus of this embodiment is same as in embodiment 1 shown in FIG. 3, and its description is omitted.

When the drawing fluctuation is a compound wave of a plurality of periods, the period and characteristic of the compound wave are most influenced by the wave of the largest amplitude (drawing fluctuation) (not shown). In frequency analysis, each period is handled as a waveform symmetric in a half period such as sine wave and cosine wave. Accordingly, regarding also the sine wave (cosine wave) having the largest amplitude (drawing fluctuation) among the drawing fluctuations, in this sine wave (cosine wave), the registration pattern is drawn in the same manner as in embodiment 1, and the detected values are averaged. Thus, the color deviation amount can be detected at high precision.

Embodiment 7

The apparatus constitution of the image forming unit of the color image forming apparatus in this embodiment is same as in embodiment 1 shown in FIG. 1, and its description is omitted.

The function block diagram of the color image forming apparatus of this embodiment is same as in embodiment 1 shown in FIG. 3, and its description is omitted.

When the drawing fluctuation is a compound wave of a plurality of periods, the period and characteristic of the compound wave are most influenced by the wave of the largest amplitude (drawing fluctuation) (not shown). In frequency analysis, each period is handled as a waveform symmetric in a half period such as sine wave and cosine wave. Accordingly, regarding also the sine wave (cosine wave) having the largest amplitude (drawing fluctuation) among the drawing fluctuations, in this sine wave (cosine wave), the registration pattern is drawn in the same manner as in embodiment 2, and the detected values are averaged. Thus, the color deviation amount can be detected at high precision.

Embodiment 8

The apparatus constitution of the image forming unit of the color image forming apparatus in this embodiment is same as in embodiment 1 shown in FIG. 1, and its description is omitted.

The function block diagram of the color image forming apparatus of this embodiment is same as in embodiment 1 shown in FIG. 3, and its description is omitted.

When the drawing fluctuation is a compound wave of a plurality of periods, the period and characteristic of the compound wave are most influenced by the wave of the largest amplitude (drawing fluctuation) (not shown). In frequency analysis, each period is handled as a waveform symmetric in a half period such as sine wave and cosine wave. Accordingly, regarding also the sine wave (cosine wave) having the largest amplitude (drawing fluctuation) among the drawing fluctuations, in this sine wave (cosine wave), the registration pattern is drawn in the same manner as in embodiment 3. Thus, the color deviation amount can be detected at high precision.

Embodiment 9

The apparatus constitution of the image forming unit of the color image forming apparatus in this embodiment is same as in embodiment 1 shown in FIG. 1, and its description is omitted.

The function block diagram of the color image forming apparatus of this embodiment is same as in embodiment 1 shown in FIG. 3, and its description is omitted.

In the foregoing embodiments 1 to 8, when drawing a pattern for detection of period in the conveying drawing fluctuation period detector, first the pattern for detection of period is drawn, and the period is determined, then the registration pattern is drawn. In this embodiment, the pattern for detection of period and registration pattern are commonly used, or the registration pattern is drawn and detected simultaneously with the pattern for detection of period. If a registration pattern drawn preliminary is present at a position conforming to the conditions of the foregoing embodiments 1 to 8, the color deviation amount is operated by using the result of measurement. It hence does not require the time for drawing the registration pattern again, and the color deviation amount can be detected at higher precision.

Thus, according to the image forming apparatus of the invention, the registration pattern is formed plural times at an arbitrary position in the period determined by the conveying drawing fluctuation period detector, and the color deviation amounts obtained from the plural registration patterns are averaged to obtain the color deviation amount, and the precision of color deviation correction is enhanced, thereby presenting a color image forming apparatus capable of obtaining images of high print quality.

What is claimed is:

1. A color image forming apparatus comprising:
an image conveying unit for transferring an image onto a surface,
a plurality of image forming units for forming the image, wherein each of the plurality of image forming units corresponds to a different color component of said image, and
a conveying drawing fluctuation period detector for detecting a period of a drawing fluctuation in said image conveying unit.

2. A color image correction apparatus comprising:
a conveying drawing fluctuation period detector for detecting a period of a drawing fluctuation in an image conveying unit,
a registration pattern generator for controlling formation of a registration pattern wherein said registration pattern comprises a plurality of images, each of said plurality of images being a different color, and
a color deviation detector for detecting color deviation of said registration pattern.

3. A color image forming apparatus comprising:
a color image transfer mechanism for transferring an image to a substrate,
a registration pattern generator for controlling formation of a registration pattern on said image transfer mechanism wherein said registration pattern comprises a plurality of images, each of said plurality of images being of a different color, and
a conveying drawing fluctuation period detector for detecting a period of fluctuation in said registration pattern.

4. The apparatus of claim 1 further comprising:
a registration pattern generator for controlling a formation of a registration pattern on said image forming units wherein said registration pattern comprises a plurality of images, each of said plurality of images being of a different color.

5. The apparatus of claim 1, further comprising:
a color deviation detector for detecting color deviation of a registration pattern image, said registration pattern image being created by said plurality of image forming units.

6. The apparatus of claim 4, further comprising:
a color deviation detector for detecting color deviation of a registration pattern image, said registration pattern image being created by said plurality of image forming units.

7. The apparatus of claim 4, wherein said registration pattern generator generates a plurality of registration patterns at arbitrary positions in a period determined by said conveying drawing fluctuation period detector, and a color deviation detector detects an amount of color deviation by averaging a plurality of color deviation amounts obtained from the plurality of registration patterns.

8. The apparatus of claim 4, wherein a plurality of registration patterns are formed at equally divided positions in a period determined by said conveying drawing fluctuation period detector.

9. The apparatus of claim 4, wherein a plurality of registration patterns are formed at arbitrary positions, said positions being in a period comprising the least common multiple of a plurality of periods of drawing fluctuation determined by the conveying drawing fluctuation period detector.

10. The apparatus of claim 4, wherein a plurality of registration patterns are formed at equally divided positions, said positions being in a period comprising the least com mon multiple of a plurality of periods of drawing fluctuation determined by the conveying drawing fluctuation period detector.

11. The apparatus of claim 4, wherein a plurality of registration patterns are formed at arbitrary positions, said positions being in a period comprising the largest of a plurality of periods of drawing fluctuation determined by the conveying drawing fluctuation period detector.

12. The apparatus of claim 4, wherein a plurality of registration patterns are formed at equally divided positions, said positions being in a period comprising the largest of a plurality of periods of drawing fluctuation determined by the conveying drawing fluctuation period detector.

13. The apparatus of claim 4, wherein the registration pattern is drawn simultaneously with a detection pattern of the conveying drawing fluctuation period detector.

14. A color image correction apparatus of claim 2, wherein said registration pattern is formed on a plurality of image forming units.

* * * * *